July 10, 1928.
R. T. CHEESEMAN
VIBRATORY CONVERTER
Filed Aug. 24, 1922
1,676,979
2 Sheets-Sheet 1
Fig. 1.
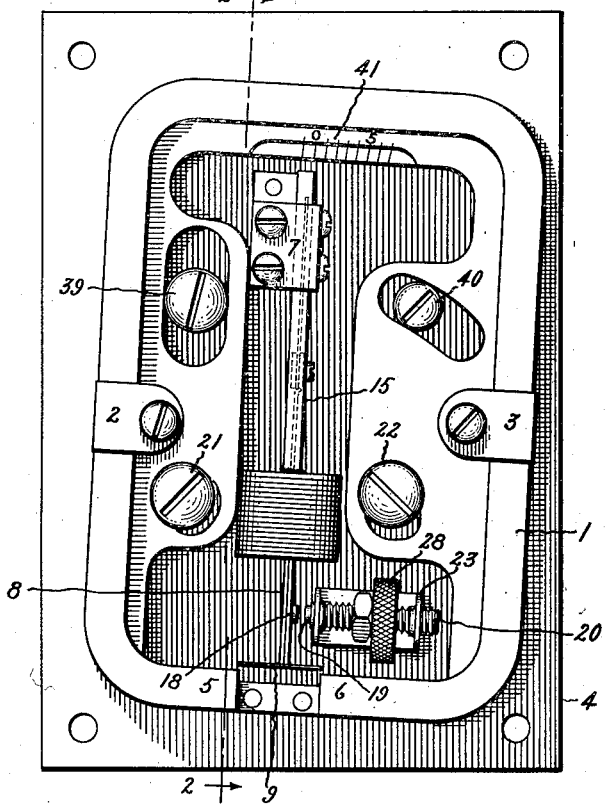
Fig. 2.
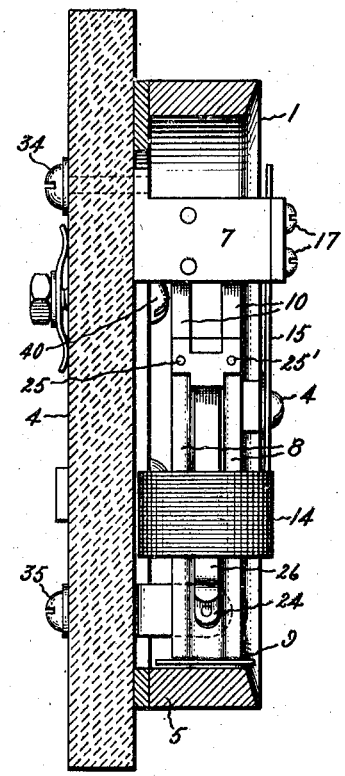
Fig. 3.
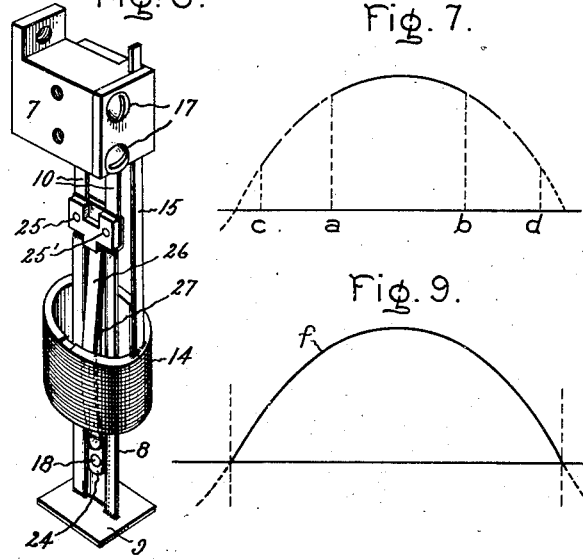
Fig. 7.
Fig. 8.
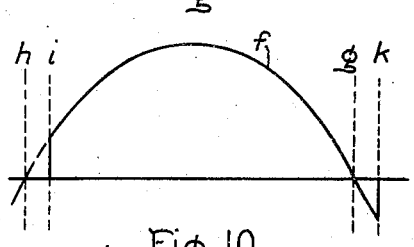
Fig. 9.
Fig. 10.
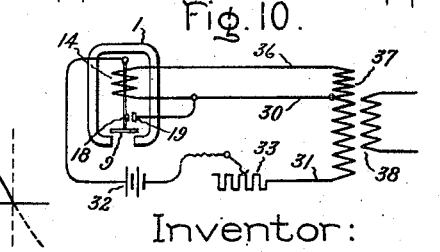
Inventor:
Ralph T. Cheeseman,
by *Albert S. Davis*
His Attorney.

July 10, 1928.
R. T. CHEESEMAN
VIBRATORY CONVERTER
Filed Aug. 24, 1922
1,676,979
2 Sheets-Sheet 2
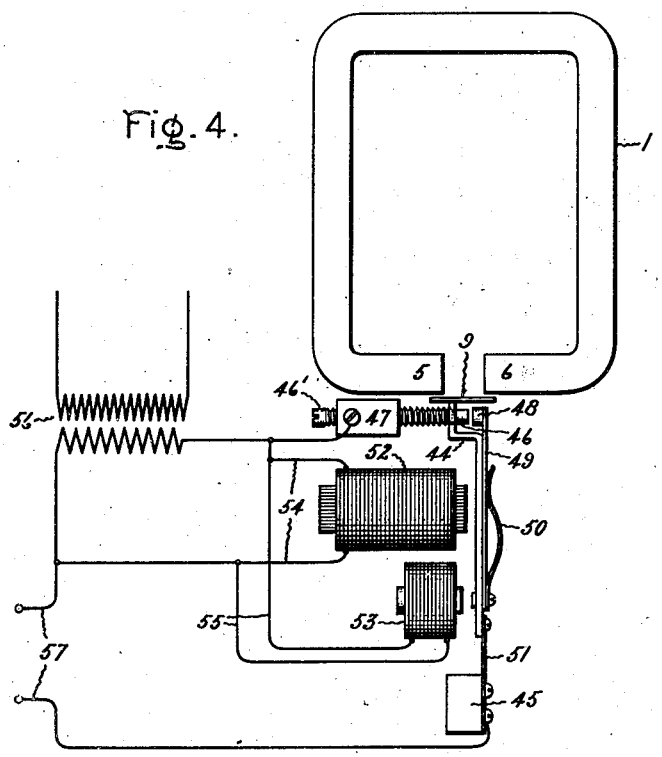
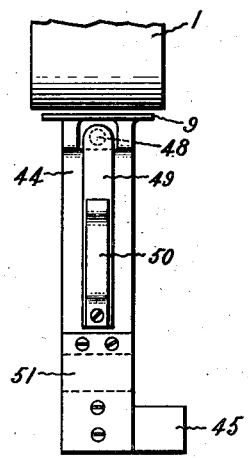
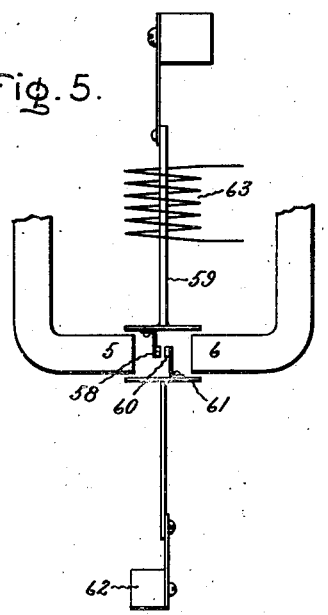
Inventor:
Ralph T. Cheeseman,
by Albert G. Davis
His Attorney.

Patented July 10, 1928.

1,676,979

UNITED STATES PATENT OFFICE.

RALPH T. CHEESEMAN, OF LYNN, MASSACHUSETTS, ASSIGNOR TO GENERAL ELECTRIC COMPANY, A CORPORATION OF NEW YORK.

VIBRATORY CONVERTER.

Application filed August 24, 1922. Serial No. 583,986.

The present invention relates to apparatus for conveying impulses of current from one circuit to another circuit; for example to convey selected undirectional impulses of current from an alternating current supply circuit to a work circuit.

It is the object of my invention to provide an apparatus which is more reliable and regular in operation, and has a higher efficiency than devices heretofore used. As one of the results of my invention the difficulties heretofore experienced with burning and disintegration of make and break contacts in this class of apparatus are substantially eliminated.

In accordance with one of the novel features of my invention, the periodicity of the vibrating member is determined substantially by a magnetic field which holds the vibrating member under tension.

The novel features of my invention will be pointed out with greater particularity in the appended claims.

For a complete understanding of my invention reference may be had to the following specification taken in connection with the accompanying drawing in which:

Fig. 1 is a plan view and Fig. 2 a longitudinal section on the lines 2—2, Fig. 1; Fig. 3 is a detail view in perspective of a vibrating member; Figs. 4, 5 and 6 illustrate modifications; Figs. 7, 8 and 9 are graphs showing the relation of a rectified current impulse to an alternating current wave; and Fig. 10 is a wiring diagram showing how my new device is connected to a circuit when used.

Referring particularly to Figs. 1, 2 and 3 of the drawing, the device illustrated comprises a magnet 1 of unidirectional polarity, conveniently a permanent magnet, mounted by screw clamps 2, 3, upon a base 4 consisting of slate, or other suitable insulating material. The permanent magnet 1 has a general rectangular shape and preferably has a closed circuit except for a gap between the poles 5, 6, which is conveniently about five-eigths of an inch in width. In other words the magnet is loop-shaped with the opposite poles in line with one another.

Mounted within the confines of the magnet 1 on a support 7 is a vibrating armature, or reed, comprising a blade 8 and a rectangular head 9, both consisting of thin sheet iron, which extends substantially at right angles to the poles 5, 6 in a position bringing the head 9 close to the poles 5, 6 and slightly lapping the gap between these poles. The blade 8 is mounted upon the support 7 by light leaf springs 10.

The mechanical properties of the vibrating reed, such as its weight and the resiliency of the spring 10, are so chosen that the natural periodicity of the vibrating reed, aside from magnetic effects, departs materially from the periodicity desired for operation, preferably being considerably lower than the periodicity of currents to be rectified by the apparatus. In operation the magnetic tension to which the reed is subjected substantially controls its periodicity of vibration. It will be observed that when the reed is moved from a neutral position the head 9 moves in a direction tangent to the poles 5, 6. By this movement the relative reluctance between the head 9 and the poles of the magnet 1 is altered without relaxing the magnetic tension. This change in the reluctance of the path of the magnetic field exerts a force tending to restore the head 9 to a neutral position analogous to the action of a spring. As the amplitude of vibrations of the reed is moderate, the motion of the armature is nearly parallel to the poles and hence the length of the gap between the head 9 and the pole of the magnet 1 toward which the head 9 moves tangentially, is changed but slightly, while the gap between the head 9 and the opposite pole varies. The reed is caused to vibrate by being magnetized with an alternating magnetic flux by alternating current flowing through a solenoid 14, surrounding the blades 8.

The solenoid 14 is supported by a stem 15 consisting of brass, or other suitable material, which is adjustably mounted on the support 7 by screws 17. The vibrator carries an electrical contact 18 which cooperates with a stationary contact 19 carried by a threaded pin 20, which passes through holes in the upwardly turned ends of a plate 23, affixed to the base 4. The plate 23 is preferably made of springy material so as to exert some tension and prevent undesired rotation of the pin 20, thereby holding the fixed contact 19 in the desired position with reference to the movable contact 18. The contact 18 is mounted on a yielding leaf spring 24, as best shown in Fig. 3. This leaf spring is connected to armature 8 by screws 25, 25', (Fig. 3). A long leaf spring 26, and a shorter leaf spring 27, which is intermediate the spring 26 and the supporting spring 24, make the contact carrier both yielding and non-periodic, and thereby prevent chattering or undesired vibrations of the contacts.

The distance between the contacts 18 and 19 may be adjusted by turning the knurled thumb screw 28, which is fixedly attached to the threaded pin 20. The width of the gap between the contacts 18 and 19 preferably is made about 0.025 inches, a variation of 50 per cent above and below this width being permissible. The pin 20 preferably is provided with forty threads to the inch so that a single turn of the pin 20 after the contacts have been brought together separates the contacts the proper distance for the most favorable operation. The contacts preferably consist of platinum-iridium alloy although other known contact materials may be used. Practically no sparking is observable during operation at the contacts. There is no tendency for the contacts to become pitted or corroded, and hence the original adjustment is maintained over a long period of time. Sticking of the contacts is entirely avoided because of the relatively wide gap and the magnetic tension which is exerted to hold the contacts apart.

As shown in Fig. 10, the above described device may be connected to an alternating current circuit 30, 31, containing a direct current load device, such, for example, as the battery 32 and preferably also a variable resistance 33. Connection is made to the terminals 34, 35, on the underside of the device, as shown in Fig. 2, which make a circuit respectively to the vibrating contact 18 and stationary contact 19. The coil 14 is connected by the conductors 30, 36 to a winding 37 which constitutes an extension of the secondary of the supply transformer 38.

The magnetization produced by the coil 14 in the vibrating armature, especially in the head 9, causes vibrations to occur in synchronism with the alternating current, causing the circuit 30, 31 to be closed during selected intervals, and delivering undirectional impulses of current to the load device 32. The duration of closure of the contacts 18, 19, can be varied by varying the relative magnetic reluctance of the gaps between the vibrator head 9 and the poles 5, 6, of the permanent magnet 1, and hence the relative effectiveness of the poles 5, 6. For example, if it is desired to increase the length of the selected wave portions the magnet 1 is so adjusted as to bring the pole 6 closer to the head 9 than the pole 5.

Referring to Fig. 7, if the width of the rectified wave is to be increased from the portion included from the lines $a$, $b$ to a wider portion as included between the lines $c$, $d$, then the magnet 1 is tilted, as above indicated, thereby decreasing the reluctance of the gap between the pole 6 and the head 9, and correspondingly increasing the reluctance between the pole 5 and the head 9. This is done by loosening the screws 21, 22 and turning the screw 39, the head of which is set off center from the stem so that it acts as a cam when rotated, and rocks or tilts the magnet. Markings have been provided on the magnet frame, as indicated at 41, whereby in conjunction with a mark on the slate base (not shown) the setting of the gaps may be indicated.

The timing of the instants of make and break of the work circuit with respect to the phase of alternating current in the supply circuit can be carried out either by a longitudinal displacement of the coil 14 upon the vibrator, or by an adjustment of air gap between the stationary magnet and the vibrator. Either adjustment alters the natural periodicity of the vibrator under the influence of magnetic forces. Although both of these displacements affect both the instants of make and break of the circuit, the movement of the coil 14 longitudinally with respect to the vibrator is most effective in timing the instant of break of the circuit and the movement of the magnet toward or away from the armature is most effective in altering the establishment or make of the work circuit.

For example, when the screws 17 are loosened and the coil 14 is moved back away from the head 9, the moment of break of the circuit will be advanced, that is, will occur sooner. For example, referring to Fig. 8, if the interruption of the supply circuit, as indicated by curve $f$, which may be assumed to represent both current and voltage in phase with each other, has occurred at a point $k$ slightly later than zero point resulting in poor rectification, then the movement of the coil 14 away from the head 9 will advance the moment of circuit interruption to the point $g$. This adjustment also somewhat advances the make of the circuit at $i$. A shifting of the instant of contact closure, or circuit make, is more effectively brought about by moving the magnet 1 longitudinally conveniently by the screw 40, the stem of which is shaped as a cam. Moving the magnet 1 toward the armature will advance the closure of the contacts, for example, from a point $i$ on the wave $f$ to a point $h$.

The full line curve $f$ (Fig. 8) shows for purpose of illustration both the make and break retarded with respect to the supply voltage (or current), but preferably the make and break of the work circuit should occur near the zero point of voltage, as shown in Fig. 9, or, if a battery is being charged at the points when the charging voltage is approximately equal to the battery voltage.

I have illustrated in Fig. 4 a modification of my invention in which a vibrating element 44 is supported at 45 so as to extend at right angles to the poles 5, 6, from a position outside of the enclosure of the permanent magnet 1. In this modification as well as in the preferred modification shown in Figs. 1 and 2, the head 9 of the vibrator is located close to but outside the gap between the poles 5, 6, and slightly overlaps the gap. The stationary contact 46 is mounted on a threaded pin 46' which passes through a hole in the vibrator 44, and is carried by a post 47. The cooperating movable contact 48 is mounted on a resilient leaf spring 49 against which bears a shorter spring 50 to make the mounting of the contact non-periodic. In this case as well as in the modification of Figs. 1 and 2, the vibrator is mounted upon a light spring 51 and is made light enough so that its period of vibration is substantially determined by the tension of the magnetic field in which the vibrator plays. Oscillations of the vibrator are produced by two magnets 52, 53, connected respectively by conductors 54, 55, to the secondary circuit of a supply transformer 56.

A movement of the magnet 53 longitudinally with respect to the armature of the vibrator 44 or a tilting of the magnet 53 will vary the phase relation of the vibrators with respect to the alternating current supplied by the transformer 56 so that the interruption of the contact may be timed with respect to the zero point of the wave similarly to the regulation effected by longitudinally adjusting the coil 14 of Figs. 1 and 2, as above explained. Unidirectional impulses of current are delivered to a load circuit 57.

In the modification of my invention shown somewhat diagrammatically in Fig. 5, the contact 58 mounted on the vibrator 59 is brought into make and break relation with a contact 60 mounted on a magnetic element 61, resiliently mounted at 62 in such proximity to the poles 5, 6, as to be under magnetic tension. When the vibrator 59 is oscillated, for example, by a coil 63, bringing the contact 58 into engagement with the contact 60, the latter will yield somewhat but the magnetic field will exert a tension upon the contact support 61 causing the two contacts to bear upon each other so firmly that a good circuit connection is established.

While I have described several specific embodiments of my invention, I wish it to be understood that various other modifications and changes may be made therein without departing from the spirit of my invention. For example, instead of the light spring support for the vibrating reed, I may use a rotatably pivoted support.

I have provided as a result of my invention a rectifier which will function without inspection and adjustment over a large range of supply line conditions which will start and stop in accordance with the current supply without sticking at the contacts, and without any undue arcing, and will maintain its original adjustment over a long period of time. My new device will adjust itself automatically to ordinary variation in frequency of the supply current, without change in mechanical adjustment. In fact, the automatic responsiveness of the device to changes in line conditions, for example, changes in voltage and frequency, is so reliable that the device may be sealed in a case, thereby preventing unauthorized persons from tampering with the adjustments and insuring uninterrupted service. Because of the ruggedness and simplicity of adjustment and reliability of my new device it is particularly suited for the charging of storage batteries in railway signal systems in which the rectifier is continuously operated.

Certain improvements in the device embodying my invention herein shown, but not claimed, constitute the invention of Ralph D. Amsden, and are described and claimed in a copending application, Serial No. 583,981 filed concurrently herewith.

What I claim as new and desire to secure by Letters Patent of the United States, is:—

1. An electric device comprising a magnet of constant polarity having opposite poles substantially in line with each other and separated by an air gap, a T-shaped armature, means for movably supporting said armature in a position magnetically centering the head of the T closely adjacent said poles outside of the confines of said gap, means for vibrating said armature and circuit-closing means operatively related with said armature.

2. A vibrating switching device comprising the combination of a magnet of constant polarity having oppositely disposed poles separated by a gap, a magnetic armature positioned adjacent said gap and lapping the same, a mounting for said armature constructed to permit a displacement of said armature laterally across said gap away from one of said poles and toward the opposite pole, means for superimposing an alternating magnetic flux on said armature and switching contacts operated by said vibrations.

3. A vibrating rectifier comprising the combination of magnetic means of constant polarity providing oppositely disposed poles separated by a gap, a plate-shaped armature of substantially the width of said gap, a flexible mounting for said armature supporting the same in position permitting vibrations across said gap and being closely adjacent said pole pieces, means for superimposing an alternating magnetic flux on said armature thereby setting up vibrations thereof, and switching contacts operated by said vibrations.

4. A vibrating switching device comprising the combination of means affording magnetic poles of opposite polarity spaced apart, a magnetic sheet metal plate which extends substantially across said gap, a magnetic stem affixed substantially at right angles to said plate, means for resiliently supporting said stem to permit vibration of said plate longitudinally with respect to said poles adjacent the gap, means for producing cyclic changes of polarity in said stem and plate to cause vibrations thereof, and switching contacts arranged to be brought in and out of operative relation by said vibration.

5. A vibrating rectifier comprising the combination of a looped permanent magnet having the ends of opposite poles facing one another and separated by a gap, a vibrating reed having a head consisting of magnetic material extending across and outside the confines of said gap in a position placing said reed under magnetic tension, a fixed support for said reed remote from said gap, an alternating current magnet acting on said reed, and cooperating make-and-break contacts one of which is mounted upon said reed, said contacts being positioned to be brought in and out of engagement when said reed is caused to vibrate by said alternating current magnet.

6. A vibrating rectifier comprising the combination of magnet poles of constant and opposite polarity separated by a gap, a magnetic armature of substantially the width of said gap, a flexible reed supporting said armature in position to permit vibrations of said armature across said gap, means for impressing an alternating magnetic field on said armature and make-and-break contacts positioned to be operated by the vibrations of said armature under the influence of said alternating field.

7. A vibrating rectifier comprising the combination of a substantially loop-shaped permanent magnet having poles separated by a gap, a vibrating reed comprising a resilient mounting extending substantially at right angles to the poles of said magnet, and a magnetic head extending substantially parallel to said poles, a support for said reed permitting vibrations of said head from one of said poles toward the other but out of contact therewith, means for magnetizing said reed with an alternating magnetic flux and make-and-break contacts positioned to be operated by the vibrations of said reed.

8. A vibrating switching device comprising the combination of a vibratory reed provided with a plate shaped magnetic armature, a magnet of constant polarity having opposite poles separated by a gap, said armature being positioned outside of said gap and so closely adjacent said poles that by the attractive force of said poles on said armature the periodicity of said reed when vibrating tangentially with respect to said poles is materially increased, means for superimposing an alternating flux on said armature to cause vibrations thereof and make and break contacts operatively associated with said reed.

9. An electric device comprising a magnetic member having oppositely disposed poles, an armature having a face substantially equal in width to the distance between said poles, means for movably supporting said armature in close magnetic relation to said poles in a position permitting tangential vibration of said armature past said poles, means for vibrating said armature and switching contacts actuated by the vibration of said armature.

10. A vibrating contact-making device comprising the combination of means affording magnetic poles of opposite polarity spaced apart, a magnetic armature having a head constructed to substantially bridge said gap, and having a small inertia relative to the strength of the field between said poles, a support for said armature positioned to enable vibration thereof with respect to said poles closely adjacent to but outside of the confines of said gap, said support being chosen to cause the periodicity of said armature to be largely determined by the magnetic field, means for cyclically changing the polarity of the armature so as to cause vibrations thereof, and switching contacts brought in and out of operative relation by said vibrations.

In witness whereof, I have hereunto set my hand this 16th day of August, 1922.

RALPH T. CHEESEMAN.